(12) United States Patent
Jiang et al.

(10) Patent No.: US 11,581,527 B2
(45) Date of Patent: Feb. 14, 2023

(54) ETHYL CELLULOSE AS A DISPERSANT FOR LITHIUM ION BATTERY CATHODE PRODUCTION

(71) Applicants: Dow Global Technologies LLC, Midland, MI (US); Dow Chemical Korea Limited, Seoul (KR)

(72) Inventors: Xin Jiang, Shanghai (CN); Qi Jiang, Shanghai (CN); Hua Ren, Shanghai (CN); Jianhai Mu, Shanghai (CN); Eungkyu Kim, Midland, MI (US); Kaoru Ohba, Tokyo (JP); Jong-Cheol Kim, Seoul (KR); Zhuo Wang, Shanghai (CN)

(73) Assignees: Dow Global Technologies LLC, Midland, MI (US); Dow Chemical Korea Limited, Seoul (KR)

( * ) Notice: Subject to any disclaimer, the term of this patent is extended or adjusted under 35 U.S.C. 154(b) by 107 days.

(21) Appl. No.: 17/049,787

(22) PCT Filed: Apr. 27, 2018

(86) PCT No.: PCT/CN2018/084772
§ 371 (c)(1),
(2) Date: Oct. 22, 2020

(87) PCT Pub. No.: WO2019/205079
PCT Pub. Date: Oct. 31, 2019

(65) Prior Publication Data
US 2021/0242447 A1    Aug. 5, 2021

(51) Int. Cl.
| H01M 4/1391 | (2010.01) |
|---|---|
| H01M 4/505 | (2010.01) |
| H01M 4/525 | (2010.01) |
| H01M 4/58 | (2010.01) |
| H01M 4/62 | (2006.01) |

(Continued)

(52) U.S. Cl.
CPC ......... H01M 4/1391 (2013.01); H01M 4/505 (2013.01); H01M 4/525 (2013.01);
(Continued)

(58) Field of Classification Search
CPC .... H01M 4/1391; H01M 4/505; H01M 4/525; H01M 4/5825; H01M 4/623;
(Continued)

(56) References Cited

U.S. PATENT DOCUMENTS 8,540,902 B2    9/2013    Xing et al.
9,085,691 B2    7/2015    Lee et al.
(Continued)

FOREIGN PATENT DOCUMENTS

CN    101752548 A    6/2010
CN    102237526 A    11/2011
(Continued)

*Primary Examiner* — Andrew J. Oyer
(74) *Attorney, Agent, or Firm* — Quarles & Brady LLP

(57) ABSTRACT

The process of making a lithium ion battery cathode comprises the step of forming a slurry of an active material, a nano-size conductive agent, a binder polymer, a solvent and a dispersant. The solvent consists essentially of one or more of a compound of Formula 1, 2, or 3, and the dispersant comprises an ethyl cellulose.

18 Claims, 3 Drawing Sheets

(51) Int. Cl.
*H01M 10/0525* (2010.01)
*H01M 4/02* (2006.01)

(52) U.S. Cl.
CPC ......... *H01M 4/5825* (2013.01); *H01M 4/623* (2013.01); *H01M 4/625* (2013.01); *H01M 10/0525* (2013.01); *H01M 2004/028* (2013.01)

(58) Field of Classification Search
CPC ............ H01M 4/625; H01M 10/0525; H01M 2004/028; H01M 4/04; H01M 4/62; H01M 4/131; Y02E 60/10
See application file for complete search history.

(56) References Cited

U.S. PATENT DOCUMENTS

| | | | |
|---|---|---|---|
| 9,087,626 B2 | 7/2015 | Xing et al. | |
| 9,484,603 B2 | 11/2016 | Kobayashi et al. | |
| 2014/0255777 A1* | 9/2014 | Jeong | H01M 4/133 |
| | | | 524/45 |
| 2017/0226365 A1* | 8/2017 | Kobayashi | H01G 11/28 |

FOREIGN PATENT DOCUMENTS

| | | |
|---|---|---|
| CN | 101757875 B | 10/2012 |
| CN | 103373724 A | 10/2013 |
| CN | 104362330 A | 2/2015 |
| CN | 105062219 A | 11/2015 |
| CN | 105895870 A | 8/2016 |
| CN | 106207094 A | 12/2016 |
| CN | 107302078 A | 10/2017 |
| KR | 2010118808 A | 6/2012 |

\* cited by examiner

Figure 2

| Solvent | NMP | DMPA | DEAC | M3DMPA |
|---|---|---|---|---|
| +1 wt% Super P | Comparative 1 | Comparative 2 | Comparative 3 | Comparative 4 |
| +1 wt% Super P + 0.1wt% STD4 | Inventive 1 | Comparative 5 | Comparative 6 | Comparative 7 |
| +1 wt% Super P + 0.1wt% STD10 | Inventive 2 | Comparative 8 | Comparative 9 | Comparative 10 |
| +1 wt% Super P + 0.1wt% MED70 | Inventive 3 | Inventive 4 | Comparative 11 | Comparative 12 |
| +1 wt% Super P + 0.2wt% STD4 | Inventive 5 | Comparative 13 | Inventive 6 | Inventive 7 |
| +1 wt% Super P + 0.2wt% STD10 | Inventive 8 | Inventive 9 | Inventive 10 | Inventive 11 |
| +1 wt% Super P + 0.2wt% MED70 | Inventive 12 | Inventive 13 | Inventive 14 | Inventive 15 |

Figure 3

| 10 wt% Super P + 5wt% CG-50 | 10 wt% Super P + 5wt% CG-650 | 10 wt% Super P + 5wt% CG-50 + 5wt% 15-S-3 | 10 wt% Super P + 5wt% CG-50 + 5wt% 15-S-7 |
|---|---|---|---|
| Comparative 14 | Comparative 15 | Comparative 16 | Comparative 17 |
| 10 wt% Super P + 5wt% CG-50 + 5wt% EH-6 | 10 wt% Super P + 5wt% CG-50 + 5wt% 15-S-9 | 10 wt% Super P + 5wt% CG-50 + 2wt% STD10 | 10 wt% Super P + 5wt% CG-650 + 2wt% STD10 |
| Comparative 18 | Comparative 19 | Inventive 16 | Inventive 17 |
| 10 wt% Super P + 5wt% CG-650 + 5wt% 15-S-3 + 2wt% STD10 | | | |
| Inventive 18 | | | |

ETHYL CELLULOSE AS A DISPERSANT FOR LITHIUM ION BATTERY CATHODE PRODUCTION

FIELD

This invention relates to the production of lithium ion batteries. In one aspect the invention relates to the production of the cathode of such batteries while in another aspect, the invention relates to the materials used in the production of such cathodes.

BACKGROUND

The significant growth of electrical vehicles and portable electronic devices have led to an increase in the demand for rechargeable, also known as secondary, batteries, especially the various types of lithium ion batteries. Modern trends of small size and light weight require that these rechargeable batteries have not only a high energy density, but are also environmentally friendly. The eco-friendly requirements apply not only to the battery product itself, but also to the production process by which it is made.

The cathode component of a lithium ion battery is made by forming a slurry from an active material (e.g., lithium cobalt oxide), and a binder polymer (e.g., polyvinylidene fluoride (PVDF)), dissolved in a solvent, coating the slurry onto an aluminum foil, and drying the coated foil to remove the solvent. The conductivity of the cathode is always a target for improvement and to this end, lithium ion battery manufacturers have added conductive agents to the mix. These agents (e.g., carbon black), form part of the slurry that is applied to the aluminum foil. Besides their good conductivity, these conductive agents are characterized by low gravity, stable structure and good chemical resistance.

Generally, the smaller size of conductive agent, the better the conductivity. Nano-size particles are well known to have a very high surface area and surface energy but because of these properties, they aggregate easily or, in other words, they are difficult to disperse. If the nano-size conductive agent particles are not well dispersed within the cathode, then their boost to cathode conductivity is muted.

In order to disperse the nano-size conductive agents and stabilize them in the cathode materials of the slurry formulation, a strong repelling force between the nano-size conductive agent particles is required. The traditional way to achieve this end is to use a static electricity mechanism to change the particle surface electric charge density and type. However, this method requires a high dosage level of dispersant.

SUMMARY

In one embodiment the present disclosure provides a process of making a lithium ion battery cathode, the process comprising the step of forming a slurry of an active material, a nano-size conductive agent, a binder polymer, a solvent and a dispersant, the solvent consisting essentially of one or more a first compound of Formula 1

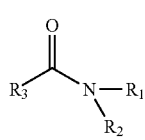

(1)

in which $R_1$ and $R_2$ are hydrogen or a C1-4 straight or branched chain alkyl or alkoxy, and $R_3$ is a C1-10 straight or branched chain alkyl or alkoxy, with the proviso that $R_1$ and $R_2$ are not both hydrogen; or one or more of a second compound of Formula 2

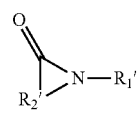

(2)

in which $R_2'$ is 2-9 ring carbon atoms each of which can have a C1-2 alkyl or alkoxy branch, and $R_1'$ is a C2-8 straight or branched chain alkyl or alkoxy; or one or more of a third compound of Formula 3

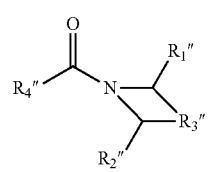

(3)

in which $R_1''$ and $R_2''$ are hydrogen or a C1-2 alkyl or alkoxy; $R_3''$ is 2-4 ring carbons each of which can have a C1-2 alkyl or alkoxy branch; and $R_4''$ is hydrogen or a C1-3 straight or
branched chain alkyl or alkoxy, and
the dispersant comprises an ethyl cellulose.

BRIEF DESCRIPTION OF THE DRAWINGS

FIG. 2 is a collection of micrographs showing the appearance of SUPER P™ conductive carbon black with and without dispersant in various solvents.

FIG. 3 is a collection of micrographs showing the appearance of SUPER P™ conductive carbon black in DMPA with and without a dispersant.

DETAILED DESCRIPTION

Definitions

Figure 1:
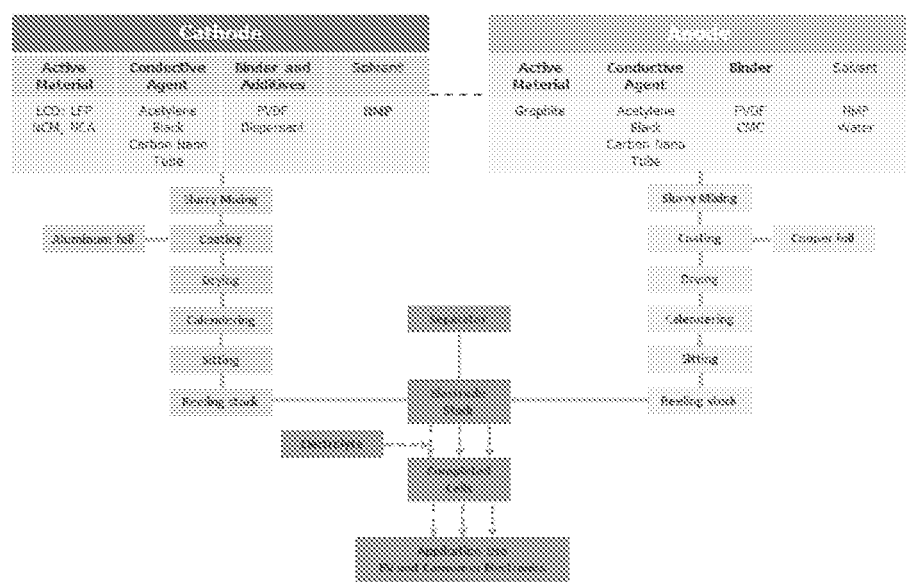
FIG. 1 is a block flow diagram describing a conventional production process for making a lithium ion battery in which NMP is used as the solvent in the formation of cathode and anode slurries from an active material, conductive agent, binder and dispersant.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Active material" and like terms mean, as used in the context of a lithium ion battery, a substance that is either the source of lithium ions or that can receive and accept lithium ions. In the context of the cathode of a lithium ion cell, the active material is the source of the lithium ions, e.g., lithium cobalt oxide, lithium manganese oxide, etc. In the context of the anode of a lithium ion cell, the active material is the receptor of the lithium ions, e.g., graphite. The active materials are typically in the form of very small particles having a diameter from 1000 nanometers to 100 micrometers.

"Alkoxy" refers to the —$OZ^1$ radical, where representative $Z^1$ include alkyl, substituted alkyl, cycloalkyl, substituted cycloalkyl, heterocycloalkyl, substituted heterocycloalkyl, silyl groups and combinations thereof. Suitable alkoxy radicals include, for example, methoxy, ethoxy, benzyloxy, t-butoxy, etc. A related term is "aryloxy" where representative $Z^1$ include aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

"Alkyl" refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

"Anode" and like terms, as used in the context of a lithium ion battery, mean the negative electrode in the discharge cycle. The anode is the electrode where oxidation takes place within the battery during discharge, i.e., electrons are freed and flow out of the battery.

"Battery" and like terms mean a collection of cells or cell assemblies which are ready for use. A battery typically contains an appropriate housing, electrical interconnections, and, possibly, electronics to control and protect the cells from failure, e.g., fire, thermal runaway, explosion, loss of charge, etc. The simplest battery is a single cell. Batteries can be primary, i.e., non-rechargeable, and secondary, i.e., rechargeable.

"Binder polymers" and like terms mean, as used in the context of a lithium ion battery, a polymer that holds the active material particles within an electrode of a lithium-ion battery together to maintain a strong connection between the electrode and the contacts. Binder polymers are normally inert to the substances in which they are in contact within the lithium ion battery during discharging, charging and storage.

"Cathode" and like terms, as used in the context of a lithium ion battery, mean the positive electrode in the discharge cycle. The lithium in a lithium ion battery is in the cathode. The cathode is the electrode where reduction takes place within the battery during discharge.

"Cell" and like terms mean a basic electrochemical unit that contains electrodes, separator, and electrolyte.

"Conductive agent" and like terms mean, as used in the context of a lithium ion battery, a substance that promotes the flow of ions between the electrodes of a cell. Carbon-based compounds and materials, e.g., acetylene black, carbon nano-tubes, carbon-based polymers, and the like, are typical conductive agents used in lithium ion batteries.

"Dispersant" and like terms mean a substance added to a suspension, usually a colloid, to improve the separation of particles and to prevent settling or clumping. Dispersants consist normally of one or more surfactants.

"Electrolyte" and like terms mean, as used in the context of a lithium ion battery, a substance that carries positively charged lithium ions from the anode to the cathode, and vice versa, through a separator.

"Lithium ion battery" and like terms mean a rechargeable, i.e., secondary, battery in which lithium ions move from the negative electrode to the positive electrode during discharge and back when charging. Lithium ion batteries use an intercalated lithium compound as one electrode material as opposed to the metallic lithium used in a non-rechargeable lithium battery (also known as a primary battery). The electrolyte, which allows for ionic movement, and the two electrodes are the constituent components of a lithium-ion battery cell.

"Nano" means one-billionth ($10^{-9}$). "Nano-size particle" and like terms mean a particle of a size, e.g., diameter, length/width/depth, etc., that is conventionally measured in billionths. Nano-size particles include particles that are smaller or larger than one-billionth, e.g., particle sizes up to one-millionth and down to one pico.

"Separator" and like terms mean, as used in the context of a lithium ion battery, a thin, porous membrane that physically separates the anode and cathode. The primary function of the separator is to prevent physical contact between the anode and cathode, while facilitating lithium ion transport within the cell. Separators are typically a simple plastic film, e.g., polyethylene or polypropylene, or a ceramic, with a pore size designed to allow lithium ion transit.

"Solvent" and like terms mean a substance that is capable of dissolving another substance (i.e., a solute) to form an essentially uniformly dispersed mixture (i.e., solution) at the molecular or ionic size level.

Production Process for Lithium Ion Battery

FIG. 1 shows a conventional production process flow diagram for a lithium ion battery in which NMP is used as a solvent. NMP is used as the solvent to dissolve binder polymers like polyvinylidene fluoride (PVDF) which is then used to form a slurry of active material, conductive agent, dispersant and other additives. Conductive agents include, but are not limited to, carbon black, carbon nano tubes, graphene and/or fullerene. Active materials include but are not limited to lithium cobalt oxide ($LiCoO_2$), lithium manganese oxide ($LiMn_2O_4$), lithium nickel manganese cobalt oxide ($LiNiMnCoO_2$ or NMC), lithium iron phosphate ($LiFePO_4$), lithium nickel cobalt aluminum oxide ($LiNiCoAlO_2$), and lithium titanate ($Li_4Ti_5O_{12}$). The slurry is then coated onto a foil, typically aluminum for the cathode and copper for the anode, and the coated foil then dried.

In the drying process (typically in an oven), NMP is evaporated without residue, and the dried foil comprises a fine film having a thickness from 50 micrometers to 200 micrometers and including a solid component which is the dried slurry comprising the binder polymers, active material, conductive agent, dispersant and other additives. The dried foil is then calendered in a calender machine, allowed to set, and then collected on a reel. Eventually the cathode and anode films are combined into an electrode stack and the cell is completed with the addition of electrolyte.

Conductive Agent

Any nano-size conductive agent can be used in the practice of embodiments of this disclosure. Typically the conductive agent is a nano-size carbon black, e.g., an acetylene black, carbon nano-tubes, etc. SUPER P™ conductive carbon black available from TIMCAL™ Graphite and Carbon is an example of a commercially available conductive agent that can be used in the practice of embodiments of this disclosure. SUPER P™ conductive carbon black has a mean particle size of approximately 1 micrometer.

Dispersant

The dispersant used in the practice of embodiments of this disclosure is ethyl cellulose, the structure of which is

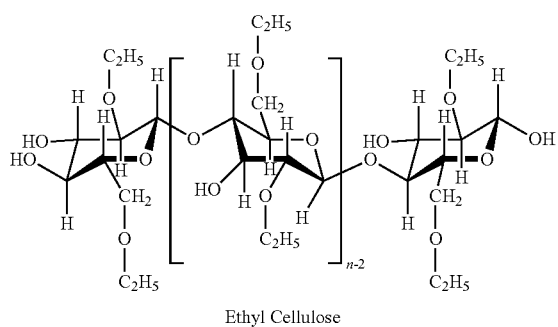

Ethyl Cellulose in which n is from 100, or 250 to 1000, or 1500. The viscosity of the ethyl cellulose is from 5 cP to 200 cP at room temperature. The dispersant can be a single ethyl cellulose, e.g., of one molecular weight, or a mixture of ethyl celluloses differing in molecular weight. Nonlimiting examples of commercially available ethyl cellulose include ETHOCEL™ Std. 4, Std. 10 and MED.70 ethylcellulose from the Dow Chemical Company. The dispersant can consist of only ethyl cellulose (preferred), or it can comprise ethyl cellulose in combination with one or more other dispersants, e.g., polyethylene glycol, polyvinylpyrrolidone, and other nonionic and anionic surfactants. If mixed with one or more other dispersants, ethyl cellulose typically comprises at least 50, or 55, or 60, or 65, or 70, or 75, wt % of the dispersant mixture.

Ethyl cellulose may serve as both dispersant and at least a portion of the polymer binder. In one embodiment the ethyl cellulose can therefore comprise all or some of the binder polymer. In those embodiments in which the ethyl cellulose serves as a binder polymer in combination with one or more other binder polymers (e.g., PVDF, polyvinylpyrrolidone, etc.), it can comprise from 0.1 to 99.9, or 1 to 90, or 10 to 80, or 20 to 70, or 30 to 60, or 40 to 60, wt % of the combination.

Solvents

The solvent used in the practice of embodiments of this disclosure is a replacement solvent for NMP in lithium ion battery production processes such as shown in FIG. 1. This solvent consists of, or consists essentially of, one or more of a compound of Formula 1, 2, or 3. In one embodiment the solvent consists of only one of any compound of Formula 1, 2, 3, or 4. In one embodiment the solvent consists of a mixture of any two compounds of Formula 1, 2, or 3. In one embodiment the solvent consists of a mixture of all three compounds of Formula 1, 2, and 3. In those embodiments in which the solvent consists of a mixture of two or more compounds of Formula 1, 2, or 3, the amount of any one of the compounds in the mixture can range from 1 to 99, or 10 to 90, or 20 to 80, or 30 to 70, or 40 to 60, weight percent (wt %) of the weight of the mixture. In one embodiment each solvent in the mixture of solvents is present in an amount within 20, or 15, or 10, or 5, or 3, or 1, wt % of each of the other solvents in the mixture.

In one embodiment the solvent used in the practice of this invention consists of a compound of Formula 1. In one embodiment the solvent used in accordance with embodiments of the present disclosure consists of two or more compounds of Formula 1

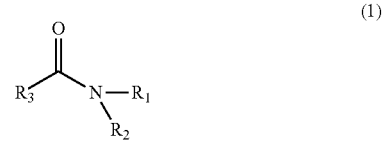

(1)

in which $R_1$ and $R_2$ are hydrogen or a C1-4 straight or branched chain alkyl or alkoxy, and $R_3$ is a C1-10 straight or branched chain alkyl or alkoxy, with the proviso that $R_1$ and $R_2$ are not both hydrogen.

In one embodiment the solvent of Formula 1 is one or more of N,N-dimethylpropionamide (DMPA); N,N-diethylpropionamide; N,N-dipropylpropionamide; N,N-dibutylpropionamide; N,N-dimethylethylpropionamide; and 3-butoxy-N-methyl propionamide. In one embodiment the solvent of Formula 1 is DMPA.

In one embodiment the solvent consists of a compound of Formula 2

(2)

in which $R_2'$ is 2-9 ring carbon atoms each of which can have a C1-2 alkyl or alkoxy branch, and $R_1'$ is a C2-8 straight or branched chain alkyl or alkoxy.

In one embodiment the solvent used in accordance with embodiments of the present disclosure consists of two or more compounds of Formula 2. In one embodiment the solvent of Formula 2 is one or more of N,N-diethyl acetamide (DEAC) and N-ethyl-ε-caprolactam. In one embodiment the solvent of Formula 2 is DEAC.

In one embodiment the solvent used in the practice of this invention consists of a compound of Formula 3

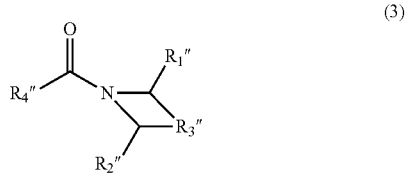

(3)

in which $R_1''$ and $R_2''$ are hydrogen or a C1-2 alkyl or alkoxy; $R_3''$ is 2-4 ring carbons each of which can have a C1-2 alkyl or alkoxy branch; and $R_4''$ is hydrogen or a C1-3 straight or branched chain alkyl or alkoxy.

In one embodiment the solvent used in the practice of this invention consists of two or more compounds of Formula 3. In one embodiment the solvent of Formula 3 is one or more of 3-methoxy-N,N-dimethyl propionamide (M3DMPA) and N-acetyl morpholine. In one embodiment the solvent of Formula 3 is M3DMPA.

The individual solvents used in the practice of this invention are known compounds, liquid at ambient conditions (23° C. and atmospheric pressure), and generally commercially available. To form a mixture of two or more solvents of any of Formula 1, 2, or 3, or of two or more solvents of Formula 1, 2, or 3, the individual solvents can simply be mixed with one another using conventional mixing equipment and standard blending protocols. The individual solvents can be added to one another in any order including simultaneously.

The solvents are eco-solvents, i.e., they do not have, or have at a reduced level, the toxicology issues associated with NMP. In one embodiment the solvents are intended as a replacement for NMP in the production process for lithium ion batteries. As such, they are used in the same manner as NMP in such processes (e.g. such as the process shown in FIG. 1). Typically, this process includes the steps of dissolving the binder polymer with the solvent, and then forming a slurry from the dissolved binder, an active material, a conductive agent and a dispersant. The slurry is then applied to a foil, and the foil dried during which the solvent is removed by evaporation.

The solvents used in the practice embodiments of the present disclosure can dissolve the binder polymer faster than NMP, which, in turn, can improve the production efficiency of the batteries. The binder polymer solutions based on the solvents used in embodiments of the present disclosure also show a lower viscosity than the binder polymer solutions based on NMP, which, in turn, also improves the production efficiency of the batteries. Moreover, some of the solvents used in the embodiments of the present disclosure have lower boiling points and higher evaporation rates than NMP which means that they can be evaporated faster with lower energy consumption and leave less residue. As NMP is typically recycled, the solvents disclosed herein are easier to recycle due to their lower boiling point and higher evaporation rate, an overall cost saving for the battery production process.

In one embodiment the disclosure provides a process of making a cathode for use in a lithium ion battery in which one or more of a compound of Formula 1, 2, or 3 is used as the solvent for the binder polymer and ethyl cellulose is the dispersant for the nano-size conductive agent. This combination of solvents and dispersant produces a good dispersion of conductive agents, strong dissolving capability for PVDF, shorter time for dissolution, and lower viscosity. These benefits bring value to lithium ion battery producers for enhancing production efficiency and lowering the manufacturing cost.

By way of example, and not limitation, some embodiments of the present disclosure will now be described in detail in the following Examples.

EXAMPLES

Materials

The solvents are N-methyl-2-pyrrolidone (Sinopharma, 99%), N,N-diethyl acetamide (Xinxing Chemical, 99.5%), 3-methoxy-N,N-dimethyl propionamide (Tianhua Pharmaceutical, 98%) and N, N-dimethylpropionamide (Xingxin, 98%).

The conductive agent is SUPER P™ conductive carbon black available from TIMCAL™ Graphite and Carbon.

The dispersants are ETHOCEL™ Std. 4, Std. 10 and MED.70 ethyl cellulose from The Dow Chemical Company.

The surfactants are TRITON™ CG-50, TRITON™ CG-650, ECOSURF™ EH-6 and TERGITOL™ 15-S series, all available from The Dow Chemical Company.

Test Procedure

Mix the dispersant with the solvent to make a 0.1 wt % and 0.2 wt % mixture, and stir the mixture until homogenous. Conductive agent is added separately to the mixture at 1 wt %. The prepared samples are dispersed in SPEEDMIX™ DAC 150-1FVZ-k at 3000 revolutions per minute (rpm) for 2 minutes. A LEICA DM2500 M microscope is used to observe the appearance of the solution and take micrographs.

FIG. 2 shows the appearance of the conductive agent with and without dispersant in various organic solvents. In FIG. 2, the composition of the mixtures is provided in column 1, with the balance of the mixture being the solvent as indicated in the headings of row 1. Without dispersant, the conductive agent aggregates in some solvents, especially DMPA, DEAC and M3DMPA. The conductive agent also does not disperse well in NMP. After adding 0.1 wt % or 0.2 wt % ethyl cellulose, the aggregation of the conductive agent improves significantly. Especially at 0.2 wt %, most of the conductive agent is well dispersed in the various solvents. The well-dispersed conductive agent can improve the conductivity of cathode materials for high performance lithium ion battery with good uniformity.

FIG. 3 shows the impact of the addition of surfactants like TRITON™ CG-50, TRITON™ CG-650, ECOSURF™ EH-6 and TERGITOL™ 15-S series on the dispersion of the conductive agent in DMPA. In FIG. 3, the composition of the mixture is provided in the cell immediately above the corresponding micrograph, with the balance of the composition being DMPA. Single TRITON™ CG-50, TRITON™ CG-650 or their mixture with TERGITOL™ 15-S series does not improve the dispersion of the conductive agent in DMPA. However, the conductive agent is dispersed very well when ethyl cellulose is added.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A process of making a lithium ion battery cathode, the process comprising the step of forming a slurry consisting of
    an active material,
    a nano-size conductive agent,
    an optional binder polymer consisting of polyvinylidene fluoride (PVDF),
    a solvent,
    a dispersant consisting of ethyl cellulose, and
    an optional surfactant,
    the solvent consisting of one or more of a compound of Formula 1

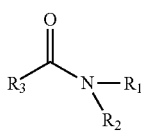

(1)

in which $R_1$ and $R_2$ are hydrogen or a C1-4 straight or branched chain alkyl or alkoxy, and $R_3$ is a C1-10 straight or branched chain alkyl or alkoxy, with the proviso that $R_1$ and $R_2$ are not both hydrogen; or one or more of a second compound of Formula 2

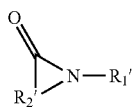

(2)

in which $R_2'$ is 2-9 ring carbon atoms each of which can have a C1-2 alkyl or alkoxy branch, and $R_1'$ is a C2-8 straight or branched chain alkyl or alkoxy; or one or more of a third compound of Formula 3

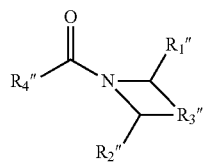

(3)

in which $R_1''$ and $R_2''$ are hydrogen or a C1-2 alkyl or alkoxy; $R_3''$ is 2-4 ring carbons each of which can have a C1-2 alkyl or alkoxy branch; and $R_4''$ is hydrogen or a C1-3 straight or branched chain alkyl or alkoxy; and mixing the slurry and dispersing the nano-size conductive agent in the solvent.

2. The process of claim 1 in which the solvent consists of a compound of Formula 1.

3. The process of claim 2 in which the solvent is N,N-dimethylpropionamide.

4. The process of claim 1 in which the solvent consists of a compound of Formula 2.

5. The process of claim 4 in which the solvent is N,N-diethyl acetamide.

6. The process of claim 1 in which the solvent consists of a compound of Formula 3.

7. The process of claim 6 in which the solvent is 3-methoxy-N,N-dimethyl propionamide.

8. The process of claim 1 in which the solvent consists of two or more of N,N-dimethylpropionamide, N,N-diethyl acetamide, and 3-methoxy-N,N-dimethylpropionamide.

9. The process of claim 1 in which the solvent consists of all three of N,N-dimethylpropionamide, N,N-diethyl acetamide, and 3-methoxy-N,N-dimethylpropionamide.

10. The process of claim 1 in which the nano-size conductive agent is carbon nano-tubes.

11. The process of claim 1 in which the binder polymer is present and the binder polymer is polyvinylidene fluoride (PVDF).

12. The process of claim 1 in which the active material is one or more of lithium cobalt oxide ($LiCoO_2$), lithium manganese oxide ($LiMn_2O_4$), lithium nickel manganese cobalt oxide ($LiNiMnCoO_2$), lithium iron phosphate ($LiFePO_4$), lithium nickel cobalt aluminum oxide ($LiNiCoAlO_2$), and lithium titanate ($Li_4Ti_5O_{12}$).

13. A cathode made by the process of claim 12.

14. A lithium ion battery comprising the cathode of claim 13.

15. The process of claim 1 wherein the surfactant is present and the surfactant is selected from the group consisting of polyethylene glycol, polyvinylpyrrolidone, and combinations thereof.

16. The process of claim 1 comprising
mixing the dispersant and the solvent to form a mixture; and
adding, after the mixing, the conductive agent to the mixture.

17. The process of claim 16 comprising forming a mixture containing from 0.1 wt % to 0.2 wt % of the ethyl cellulose based on the total weight of the mixture.

18. The process of claim 17 comprising
applying the slurry to a foil; and
drying the foil to remove the solvent.

* * * * *